United States Patent
Shin et al.

(10) Patent No.: US 9,661,314 B2
(45) Date of Patent: May 23, 2017

(54) APPARATUS AND METHOD FOR ENCODING/DECODING MULTI-VIEW IMAGES

(75) Inventors: Hong Chang Shin, Seoul (KR); Gun Bang, Daejeon-si (KR); Gi Mun Um, Daejeon-si (KR); Tae One Kim, Daejeon-si (KR); Eun Young Chang, Daejeon-si (KR); Won Sik Cheong, Daejeon-si (KR); Nam Ho Hur, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 621 days.

(21) Appl. No.: 14/128,399

(22) PCT Filed: Jul. 2, 2012

(86) PCT No.: PCT/KR2012/005253
§ 371 (c)(1),
(2), (4) Date: Dec. 20, 2013

(87) PCT Pub. No.: WO2013/002622
PCT Pub. Date: Jan. 3, 2013

(65) Prior Publication Data
US 2014/0132743 A1 May 15, 2014

(30) Foreign Application Priority Data
Jun. 30, 2011 (KR) .................. 10-2011-0064250

(51) Int. Cl.
*H04N 13/04* (2006.01)
*H04N 13/00* (2006.01)

(52) U.S. Cl.
CPC ..... *H04N 13/0445* (2013.01); *H04N 13/0022* (2013.01); *H04N 13/0029* (2013.01); *H04N 13/0048* (2013.01)

(58) Field of Classification Search
CPC .......... H04N 13/0048; H04N 13/0445; H04N 13/0022; H04N 13/0029
See application file for complete search history.

(56) References Cited

U.S. PATENT DOCUMENTS

| | | | | |
|---|---|---|---|---|
| 2008/0063305 A1* | 3/2008 | Lim | .................. | G06T 3/40 382/298 |
| 2009/0304299 A1* | 12/2009 | Motomura | ............ | G06T 3/4007 382/254 |

(Continued)

FOREIGN PATENT DOCUMENTS

| | | |
|---|---|---|
| KR | 10-2005-0121246 A | 12/2005 |
| KR | 10-2008-0022980 A | 3/2008 |
| KR | 10-1040766 B1 | 6/2011 |

OTHER PUBLICATIONS

International Search Report issued Dec. 14, 2012 in counterpart International Patent Application No. PCT/KR2012/005253. (5 pages including English translation).

*Primary Examiner* — Sath V Perungavoor
*Assistant Examiner* — Xiaolan Xu
(74) *Attorney, Agent, or Firm* — NSIP Law (57) ABSTRACT

Provided are an image magnification apparatus and method for three-dimensional display images. A multi-view image magnification apparatus includes: a region designation detection unit for detecting detection regions corresponding to the magnification regions of three-dimensional display images from original view images; a magnification ratio determination unit for determining the magnification ratios of the magnification regions; and a partial multiplexing unit for multiplexing non-detection regions except for the detection regions of the original view images according to a predetermined resolution and multiplexing the detection regions according the resolution which is different from the resolution of the non-detection regions on the basis of the (Continued)

magnification ratios. The present invention can magnify the images without lowering the resolution in a three-dimensional display.

19 Claims, 8 Drawing Sheets

(56) References Cited

U.S. PATENT DOCUMENTS

| | | | | |
|---|---|---|---|---|
| 2011/0292190 A1* | 12/2011 | Kim | ............... | H04N 13/0022 348/54 |
| 2012/0127273 A1* | 5/2012 | Zhang | ............... | H04N 13/0022 348/46 |
| 2012/0257011 A1* | 10/2012 | Mengwasser | ........ | H04N 19/597 348/43 |

* cited by examiner

APPARATUS AND METHOD FOR ENCODING/DECODING MULTI-VIEW IMAGES

CROSS-REFERENCE TO RELATED APPLICATIONS

This application is a National Phase Entry of International Patent Application No. PCT/KR2012/005253, filed on Jul. 2, 2012, which claims priority to and the benefit of Korean Patent Application No. 10-2011-0064250, filed on Jun. 30, 2011, the disclosure of which is incorporated herein by reference in its entirety.

TECHNICAL FIELD

The present invention relates to a three-dimensional (3D) display, and more particularly, to an apparatus and method for enlarging an image in a 3D display.

BACKGROUND ART

A current 3D display displays images of more than two views on spatially divided display panels. The images of more than two views are simultaneously displayed.

Views of simultaneously displayed images are separated from each other according to a polarization film, lenticular sheet, parallax barrier, etc. Accordingly, images of different views are provided to two eyes of a person and the displayed images are recognized as a 3D image by the person.

SUMMARY OF INVENTION

Technical Problem

An object of the present invention is to provide a multi-view video coding apparatus and method.

Another object of the present invention is to provide a multiview video decoding apparatus and method.

Another object of the present invention is to provide an image enlarging apparatus and method in a 3D display.

Another object of the present invention is to provide an apparatus and method for enabling partial enlargement of an image in a 3D display.

Another object of the present invention is to provide an apparatus and method for enabling image enlargement without deteriorating resolution in a 3D display.

Another object of the present invention is to provide a depth adjustment apparatus and method in a 3D display.

Another object of the present invention is to provide a depth adjustment apparatus and method for enabling depth adjustment through image enlargement without deteriorating resolution in a 3D display.

Technical Solution

In accordance with one aspect of the present invention, an image enlarging apparatus for a 3D display image includes a region designation and detection unit for detecting detection regions corresponding to an enlargement region of the 3D display image from source view images, an enlargement rate determination unit for determining an enlargement rate of the enlargement region, and a scalable multiplexing unit for multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

The region designation and detection unit may generate enlargement region information on the basis of the 3D display image and designate the enlargement region on the basis of the generated enlargement region information.

The region designation and detection unit may receive externally designated enlargement region information and designate the enlargement region on the basis of the received enlargement region information.

The region designation and detection unit may designate the enlargement region in a rectangular form.

The region designation and detection unit may designate an object included in the 3D display image as the enlargement region.

The enlargement rate determination unit may receive enlargement rate information and determine the enlargement rate on the basis of the received enlargement rate information.

The scalable multiplexing unit may multiplex the detection regions in resolution equal to or higher than the resolution of the non-detection regions.

The scalable multiplexing unit may resize the non-detection regions and multiplex the detection regions in resolution corresponding to a value obtained by multiplying the resolution of the resized non-detection regions by the enlargement rate.

The scalable multiplexing unit may include a disparity adjustment unit for generating a partially enlarged image corresponding to the source view images by resizing the non-detection regions in the source view images, resizing the detection regions at a rate different from that of the non-detection regions on the basis of the enlargement rate, and adjusting disparity of the resized detection regions, and a multiplexing unit for performing multiplexing on the basis of the partially enlarged image.

In accordance with another aspect of the present invention, an image enlarging method for a 3D display image includes the steps of designating an enlargement region in the 3D display image, detecting detection regions corresponding to the enlargement region from source view images, determining an enlargement rate of the enlargement region, and multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

In accordance with another aspect of the present invention, an multiview video coding apparatus for a display image includes a region designation and detection unit for detecting detection regions corresponding to an enlargement region of the 3D display image from source view images, an enlargement rate determination unit for determining an enlargement rate of the enlargement region, and a scalable multiplexing unit for multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

The scalable multiplexing unit may multiplex the detection regions in resolution equal to or higher than the resolution of the non-detection regions.

The scalable multiplexing unit may resize the non-detection regions and multiplex the detection regions in resolution corresponding to a value obtained by multiplying the resolution of the resized non-detection regions by the enlargement rate.

The scalable multiplexing unit may include a disparity adjustment unit for generating a partially enlarged image corresponding to the source view images by resizing the non-detection regions in the source view images, resizing the detection regions at a rate different from that of the non-detection regions on the basis of the enlargement rate, and adjusting disparity of the resized detection regions, and a multiplexing unit for performing multiplexing on the basis of the partially enlarged image.

In accordance with another aspect of the present invention, a multiview video coding method for a 3D display image includes the steps of designating an enlargement region in the 3D display image, detecting detection regions corresponding to the enlargement region from source view images, determining an enlargement rate of the enlargement region, and multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

In accordance with another aspect of the present invention, a multiview video decoding apparatus for a display image includes a region designation and detection unit for detecting detection regions corresponding to an enlargement region of the 3D display image from source view images, an enlargement rate determination unit for determining an enlargement rate of the enlargement region, and a scalable multiplexing unit for multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

The scalable multiplexing unit may multiplex the detection regions in resolution equal to or higher than the resolution of the non-detection regions.

The scalable multiplexing unit may resize the non-detection regions and multiplex the detection regions in resolution corresponding to a value obtained by multiplying the resolution of the resized non-detection regions by the enlargement rate.

The scalable multiplexing unit may include a disparity adjustment unit for generating a partially enlarged image corresponding to the source view images by resizing the non-detection regions in the source view images, resizing the detection regions at a rate different from that of the non-detection regions on the basis of the enlargement rate, and adjusting disparity of the resized detection regions, and a multiplexing unit for performing multiplexing on the basis of the partially enlarged image.

In accordance with another aspect of the present invention, a multiview video decoding method for a 3D display image includes the steps of designating an enlargement region in the 3D display image, detecting detection regions corresponding to the enlargement region from source view images, determining an enlargement rate of the enlargement region, and multiplexing non-detection regions other than the detection regions in the source view images in predetermined resolution and multiplexing the detection regions in resolution different from that of the non-detection regions on the basis of the enlargement rate, wherein the source view images are the basis of the 3D display image and have different views for the same scene of the same time.

Advantageous Effects

The present invention enables image enlargement without deteriorating resolution in a 3D display.

MODE FOR INVENTION

The above and other aspects of the present invention will be described in detail through preferred embodiments with reference to the accompanying drawings. The same reference numbers will be used throughout this specification to refer to the same or like parts. In the following description of the present invention, a detailed description of known functions and configurations incorporated herein will be omitted when it may obscure the subject matter of the present invention.

Figure 1:
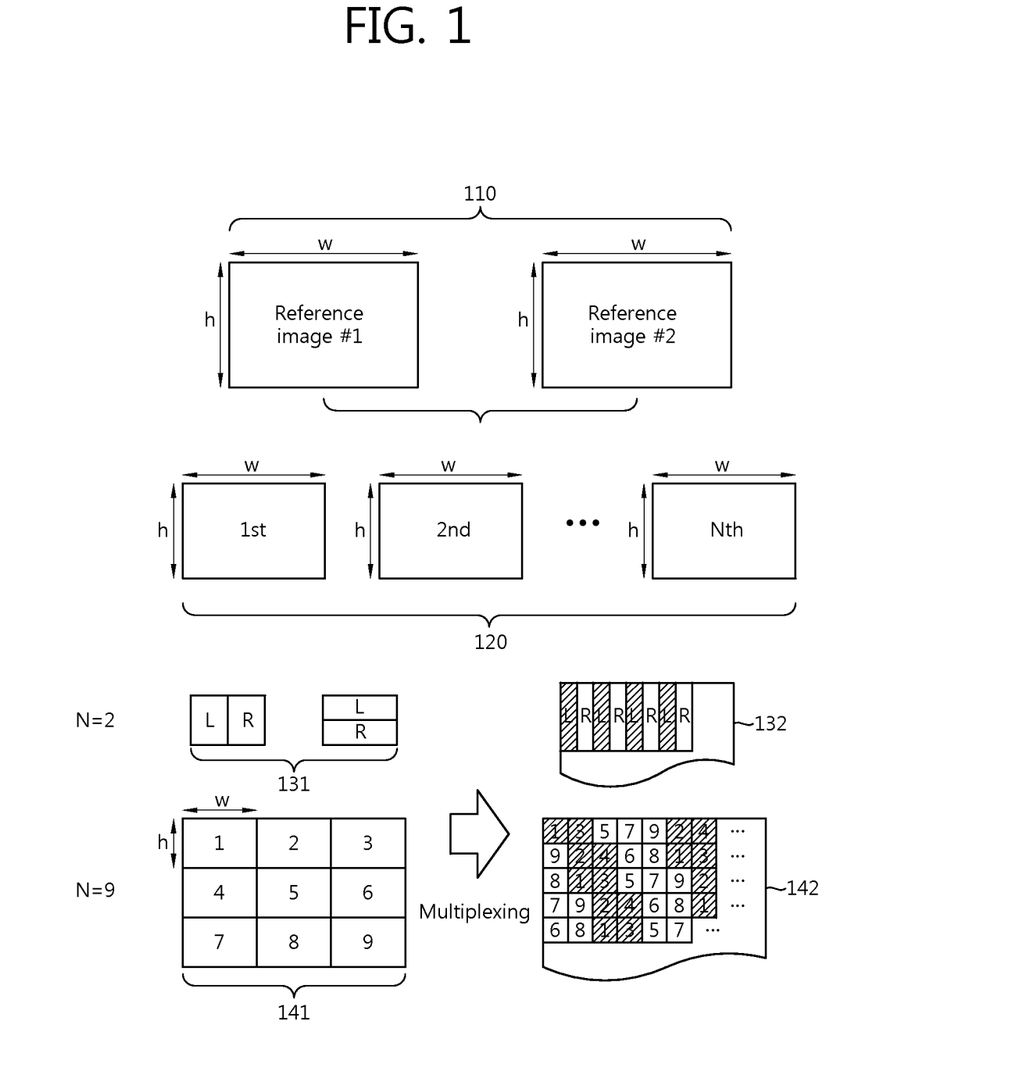
FIG. 1 illustrates a configuration of a 3D display image.

FIG. 1 illustrates a configuration of a 3D display image. FIG. 1 shows the relationship between the number of views and resolution in a 3D display.

Referring to FIG. 1, two reference images 110 and source view images 120 of N different views, generated using the reference images 110 are present. Here, the source view images 120 are original images before being multiplexed and have different views for the same scene of the same time. N denotes the number of views of simultaneously displayed source images.

The source view images 120 are arranged to satisfy an input format of a 3D display, like multiview images 131 and 141, and provided to the 3D display. FIG. 1 shows the multiview images 131 and 141 that respectively have the number of views of 2 and 9.

The multiview images 131 and 141 are multiplexed, that is, pixel-rearranged to generate 3D display images 132 and 142, respectively. Here, the 3D display images 132 and 142 are recognized as stereoscopic images, that is, 3D images when viewed through a 3D display device.

As shown in FIG. 1, a display panel is spatially divided in the 3D display and multiplexed source view images are simultaneously displayed. Accordingly, trade-off is present between the number of views and resolution per view in the 3D display.

For example, a stereoscopic display simultaneously displays images of left and right views, and thus resolution per view is reduced by half compared to the left and right views. Even in a multiview display that displays images of two or more views, resolution per view decreases compared to the original views as the number of views increases.

Figure 2:
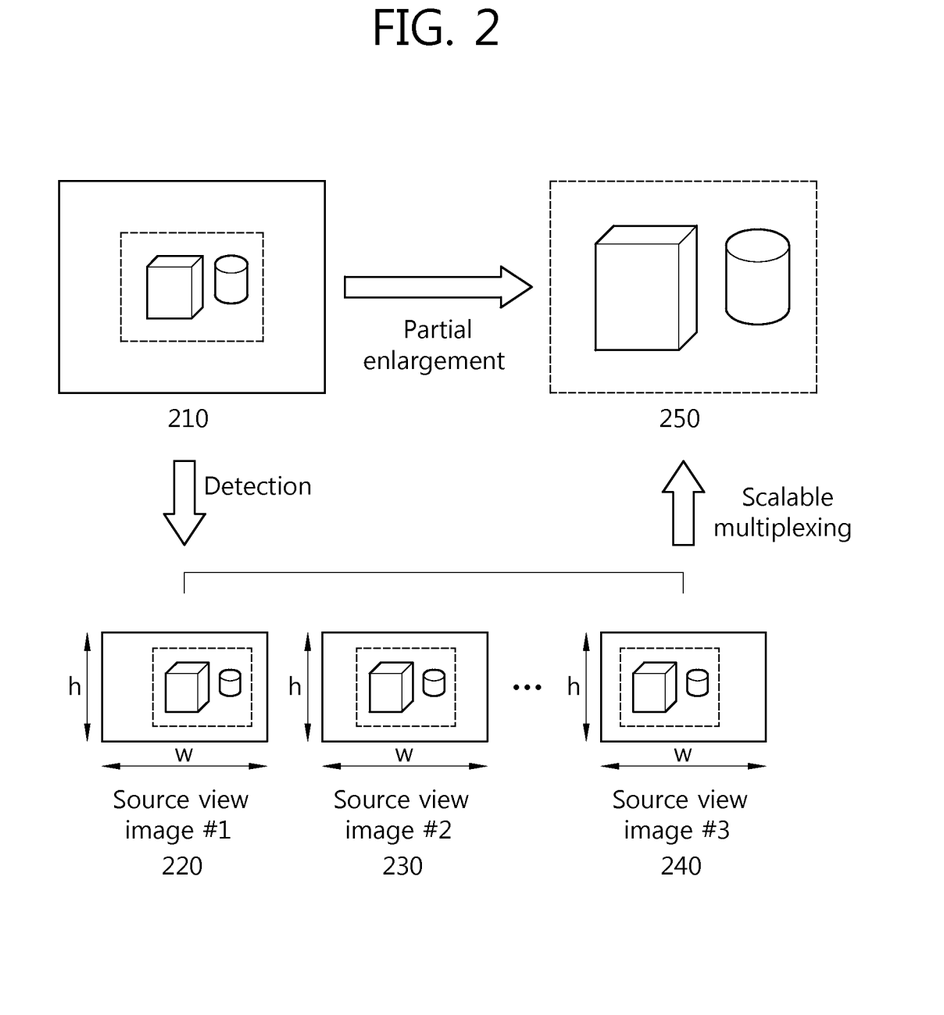
FIG. 2 is a conceptual view of a method of partially enlarging a 3D display image according to an embodiment of the present invention.

FIG. 2 is a conceptual view of a method of partially enlarging a 3D display image according to an embodiment of the present invention. FIG. 2 shows a 3D display image 210, source view images 220, 230 and 240, and an enlarged 3D display image 250. N denotes the number of views of simultaneously displayed source view images.

The 3D display image 210 shown in FIG. 2 is recognized as a 3D image when viewed through a 3D display device. As described above with reference to FIG. 1, the 3D display image 210 is a view-multiplexed image obtained by rearranging pixels of the source view images 220, 230 and 240. A view-multiplexed image is recognized as a 3D image according to the human visual characteristic and properties of 3D display when viewed through a 3D display device.

For partial enlargement, an enlargement region is designated in the 3D display image 210. The enlargement region means a region that needs to be enlarged in the 3D display image. The region defined by a dotted line in the 3D display image 210 represents the enlargement region.

The enlargement region may be designated as a rectangular region as shown in FIG. 2 or as other shapes. Alternatively, only an object included in the 3D display image may be designated as an enlargement region.

Detection regions are detected from the source view images 220, 230 and 240. The detection regions in the source view images 220, 230 and 240 correspond to the enlargement region of the 3D display image. Regions defined by dotted lines in the source view images 220, 230 and 240 represent the detection regions.

After the detection process, an enlargement rate for the enlargement region is determined. The enlargement rate may be determined according to user input. The enlargement rate can be gradually adjusted in an image enlarging apparatus. In this case, the corresponding image is enlarged according to the adjusted enlargement rate.

The detection regions and other regions of the source view images 220, 230 and 240 are resized in different sizes. Accordingly, when the regions other than the detection regions in the source view images 220, 230 and 240 are multiplexed in predetermined resolution, the detection regions are multiplexed (or pixel-rearranged) in resolution different from the resolution of the other regions according to the enlargement rate. The multiplexing process is referred to as scalable multiplexing. As a scalable multiplexing result, a 3D display image 250 partially enlarged without resolution restriction is generated.

The source view images 220, 230 and 240 are resized at a predetermined rate when multiplexed whereas the detection regions are partially resized such that the detection regions have a size larger than those of the regions other than the detection regions by the enlargement rate after resized, and thus resolution deterioration can be prevented according to the enlargement rate. That is, the detection regions can be multiplexed in resolution equal to or higher than that of the regions other than the detection regions. Here, the partially enlarged 3D display image 250 can provide an enlarged image without having resolution deterioration.

For example, if the regions other than the detection regions are resized to a size of ⅑ (⅓ in width and ⅓ in length) and thus resolution thereof is reduced to ⅑ when the source view images 220, 230 and 240 are resized and multiplexed, the detection regions can be resized to a size of 4/9 (⅔ in width and ⅔ in length) during multiplexing such that the detection regions are seen to be enlarged twice in width and length, compared to the other regions. Here, the resolution of the detection regions corresponds to 4/9 (⅔ in width and ⅔ in length) of the resolution of the source view images 220, 230 and 240. Accordingly, the resolution of the detection regions can be prevented from being reduced while the detection regions are viewed as if they are enlarged.

Figure 3:
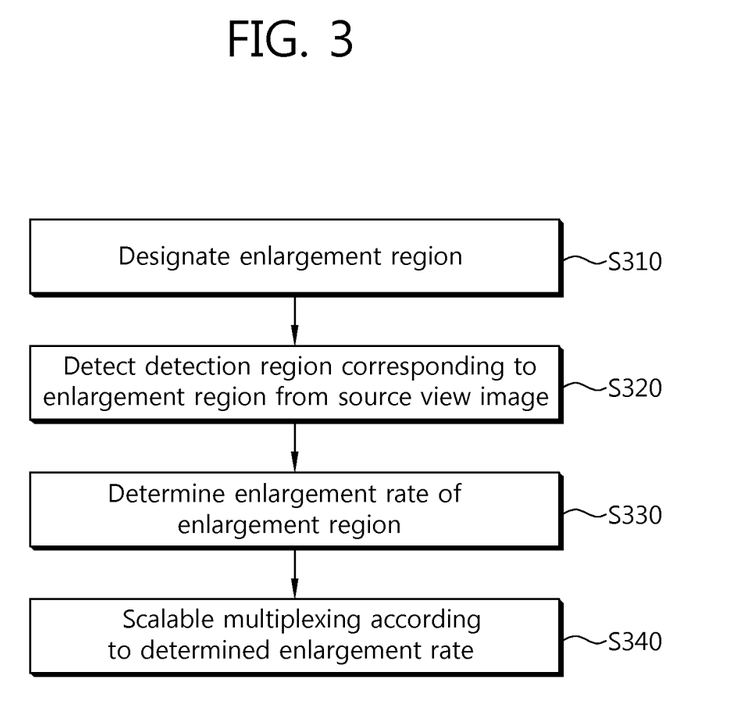
FIG. 3 is a flowchart illustrating a method of partially enlarging a 3D display image according to an embodiment of the present invention.

FIG. 3 is a flowchart illustrating a method of partially enlarging a 3D display image according to an embodiment of the present invention. A multiview video coding and/or decoding procedure according to an embodiment of the present invention may use the method of partially enlarging a 3D display image shown in FIG. 3. FIG. 3 shows the partial enlargement process shown in FIG. 2 in sequence.

Referring to FIG. 3, an enlargement region in a 3D display image is designated (S310). As described above with reference to FIG. 2, the enlargement region can be designated as a rectangular region or regions having other shapes. Otherwise, only an object included in the image can be designated as the enlargement region.

Detection regions corresponding to the enlargement region are detected from source view images (S320).

An enlargement rate of the enlargement region is determined (S330). As described above with reference to FIG. 2, the enlargement rate can be determined according to user input. Furthermore, the enlargement rate can be adjusted gradually in an image enlarging apparatus. In this case, the image is enlarged according to the adjusted enlargement rate.

The enlargement rate for image enlargement without deteriorating resolution according to an embodiment of the present invention has the range represented by the following expression 1.

$$1 \leq \text{X\_Ratio} \leq \frac{I_x}{O_x}, \qquad \text{[Expression 1]}$$

$$1 \leq \text{Y\_Ratio} \leq \frac{I_y}{O_y}. \ (O \leq I)$$

Here, X_Ratio denotes an enlargement rate of X axis, Y_Ratio denotes an enlargement rate of Y axis, $I_x$ and $I_y$ represent resolution of one source view image, and $O_x$ and $O_y$ represent resolution of one source view image multiplexed and displayed in multiview display.

Finally, Scalable multiplexing is performed on the source view images (S340). In this case, the detection regions are scalable-multiplexed in resolution corresponding to (O/I)*Ratio of the resolution of the source view image. Here, Ratio denotes the enlargement rate determined in step S330.

Figure 4:
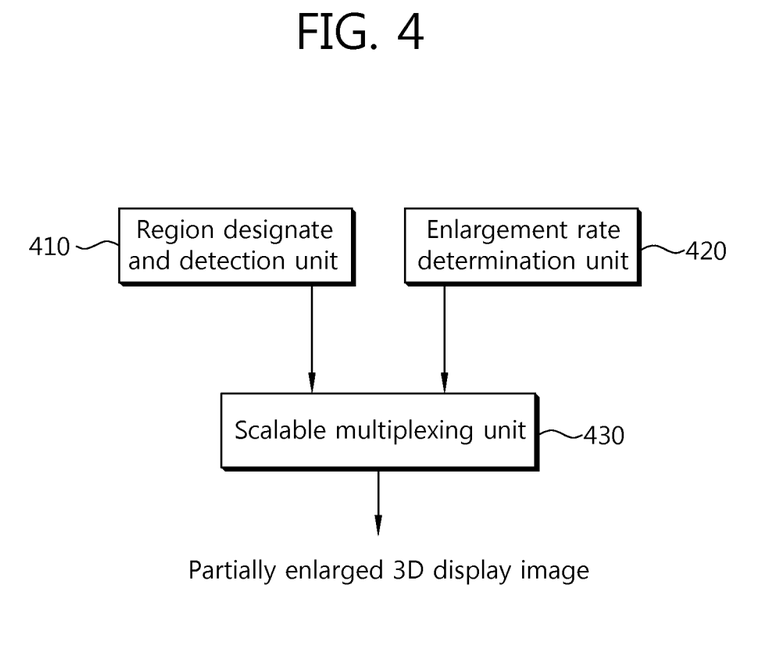
FIG. 4 is a block diagram of an image enlarging apparatus in a 3D display according to an embodiment of the present invention.

As a scalable multiplexing result, the resolution of the source view regions is maintained as (O/I)*Ratio, compared to the resolution of the one source view image, while the resolution of the regions other than the detection regions in the source images is reduced to O/I, compared to the resolution of the one source view image. Accordingly, a 3D display image generated by multiplexing can provide a partially enlarged image without having resolution deterioration FIG. 4 is a block diagram of an image enlarging apparatus in a 3D display according to an embodiment of the present invention. A multiview video coding and/or decoding apparatus according to an embodiment of the present invention may include the image enlarging apparatus shown in FIG. 4. Referring to FIG. 4, the image enlarging apparatus includes a region designation and detection unit 410, an enlargement rate determination unit 420, and a scalable multiplexing unit 430.

The region designation and detection unit 410 may designate an enlargement region by generating enlargement region information in a 3D display image. In addition, the region designation and detection unit 410 may designate the enlargement region by receiving externally generated enlargement region information. As described above with reference to FIGS. 2 and 3, the enlargement region may be designated as a region having a rectangular shape or other shapes. Otherwise, only an object included in the image may be designated as the enlargement region. The region designation and detection unit 410 detects detection regions corresponding to the enlargement region from source view images. The region designation and detection unit 410 may output information about the enlargement region or the detection regions.

The enlargement rate determination unit 420 may determine an enlargement rate by receiving enlargement rate information input by a user. Otherwise, the enlargement rate determination unit 420 may determine the enlargement rate such that the enlargement rate is gradually adjusted. In this case, the enlargement region is enlarged according to the adjusted enlargement rate. The enlargement rate determination unit 420 may output the enlargement rate information.

The scalable multiplexing unit 430 performs scalable multiplexing on the detection regions of the source view images and regions other than the detection regions. A scalable multiplexing operation of the scalable multiplexing unit 430 corresponds to those described with reference to FIGS. 2 and 3. A partially enlarged 3D display image generated according to scalable multiplexing can provide an enlarged image without having resolution deterioration.

The image enlarging apparatus and method described with reference to FIGS. 2, 3 and 4 provide a rendering technique capable of partially enlarging a 3D display image. The image enlarging apparatus and method according to the aforementioned embodiments do no cause resolution deterioration when enlarging an image, and thus they can be applied to fields such as a 3D medical image display that requires partial enlargement.

Figure 5:
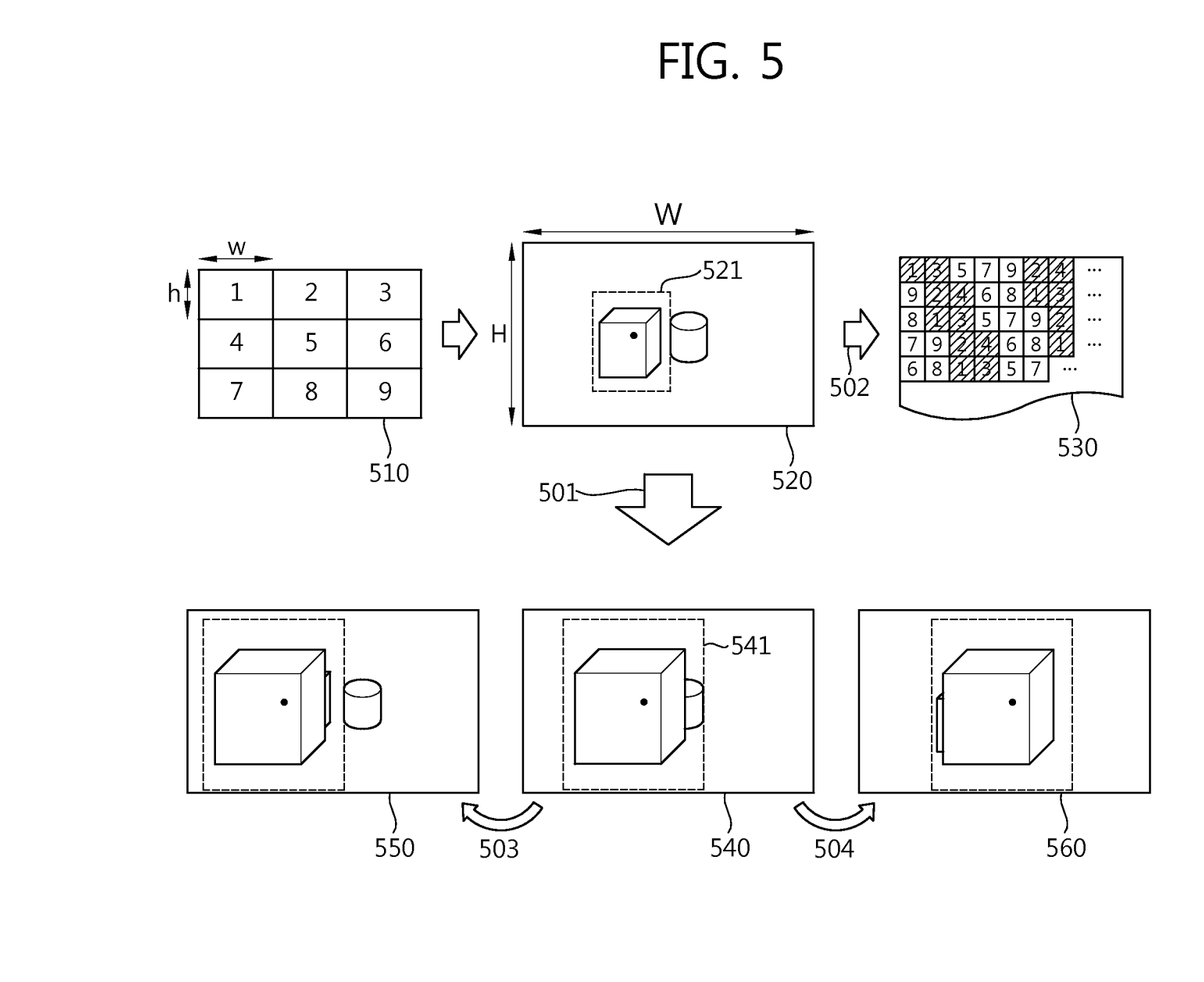
FIG. 5 is a conceptual view of a method of adjusting the depth of a 3D display image according to an embodiment of the present invention.

FIG. 5 is a conceptual view of a method of adjusting the depth of a 3D display image according to an embodiment of the present invention. The depth adjustment method shown in FIG. 5 uses the image enlarging method according to the embodiment of the present invention.

FIG. 5 shows a multiview image 510, a single-view image 520, a partially enlarged image 540, disparity-adjusted images (550 and 560), and a partially enlarged 3D display image 530.

The multiview image 510 corresponds to 3D display source view images arranged to satisfy 3×3 input format. The single-view image 520 is a source view image corresponding to a single view from among multiple views of the multiview image 510 before being multiplexed 502.

A detection region 521 of the single-view image 520, which corresponds to an enlargement region of a 3D display image, can be partially enlarged using the image enlarging method according to the embodiment of the present invention, described above with reference to FIGS. 2, 3 and 4. Here, the detection region 521 may be a specific object or a specific range, as described above.

The detection region is not enlarged in a resized image before being multiplexed and is resized to a different size (enlargement rate). Accordingly resolution deterioration does not occur.

When the single-view image 520 is resized, if the detection region 521 is resized to a size different from the size of a region other than the detection region, the partially enlarged image 540 obtained by partially enlarging the detection region 521 is provided. A process of generating the partially enlarged image 540 from the single-view image 520 is referred to as a detection region enlargement process 501. A region defined by a dotted line in the partially enlarged image 540 represents an enlarged detection region 541.

When the position of the enlarged detection region 541 in the partially enlarged image 540, that is, an enlargement object or an enlargement region is shifted, the disparity-adjusted images 550 and 560 are generated. A process of generating the disparity-adjusted images 550 and 560 from the partially enlarged image 540 is referred to as a disparity adjustment process 503 and 504. The position of the enlarged detection region 541 may be moved to the left or right, as shown in FIG. 5, or moved in the vertical direction. Otherwise, the position of the enlarged detection region 541 may be moved to an arbitrary direction according to application thereof or as necessary.

When disparity is varied as described above, the depth of an object in a 3D display image is changed. Depth change means that the corresponding object is recognized as if it is projected forward or depressed backward from a 3D display screen.

Finally processed multiview images are multiplexed, the partially enlarged 3D display image 530 in an adjusted depth is generated.

Figure 6:
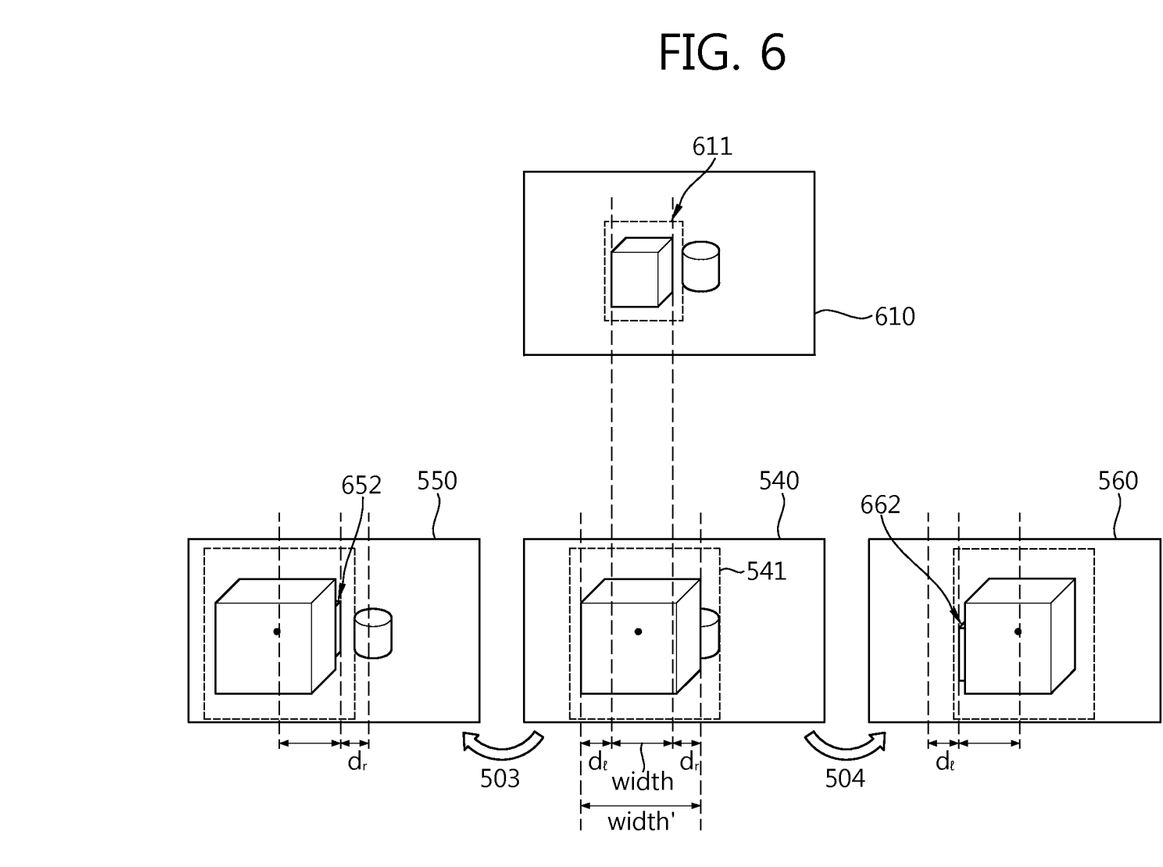
FIG. 6 illustrates a moving range of an enlarged detection region according to a disparity adjustment according to an embodiment of the present invention.

FIG. 6 illustrates a moving range of an enlarged detection region according to a disparity adjustment method according to an embodiment of the present invention.

FIG. 6 shows a non-enlarged image 610, the partially enlarged image 540, and the disparity-adjusted images 550 and 560. The non-enlarged image 610 is an image obtained by resizing a single-view source image, to which the detection region enlargement process is not applied. The partially enlarged image 540 is obtained by resizing the single-view source image and partially enlarging a detection region in the single-view source image. The partially enlarged image 540 corresponds to the partially enlarged image shown in FIG. 5.

A region 611 defined by a dotted line in the non-enlarged image 610 corresponds to the detection region of the single-view source image. A region defined by a dotted line in the partially enlarged image 540 represents an enlarged detection region 541. The enlarged detection region 541 corresponds to the enlarged detection region shown in FIG. 5.

When the detection region enlargement process is used on the assumption that enlargement rates in width and length are fixed, the detection region (a region to be partially enlarged) is enlarged by $$\frac{\text{width}'}{\text{width}}.$$

When the position of the enlarged detection region 541 in the partially enlarged image 540, that is, an enlargement object or enlargement range is shifted to the left by $d_l$ or shifted to the right by $d_r$, the disparity-adjusted images 550 and 560 are generated.

The moving range is limited to a range that does not generate an uncovered area. An uncovered area 662 is generated when the position of the enlarged detection region 541 is moved to the right by $d_r$ or more. An uncovered area 652 is also generated when the position of the enlarged detection region 541 is moved to the left by $d_l$ or more.

Since the uncovered area is an unseen area, that is, an area having no information, a black area such as a hole is seen when the uncovered area is generated. When the black area generated, a post process such as interpolation is needed in order to generate information on the black area. Accordingly, the moving range is limited such that the black area is not generated.

As described above with reference to FIG. 5, the enlarged detection region 541 may be vertically moved or moved to an arbitrary direction according to application thereof or as necessary. The principle of determining the moving range of the enlarged detection region 541 is equally applied to a case in which the enlarged detection region 541 is moved horizontally, a case in which the enlarged detection region 541 is moved vertically, and a case in which the enlarged detection region 541 is moved to an arbitrary direction.

When the depth adjustment method using the image enlarging method according to the embodiment of the present invention is employed, it is possible to provide depth adjustment effect that a scene producer or user desires according to enlargement and disparity adjustment of a target object. Examples of depth adjustment effect include special effect that makes a specific object become bigger as it approaches a viewer in a film or advertisement.

Figure 7:
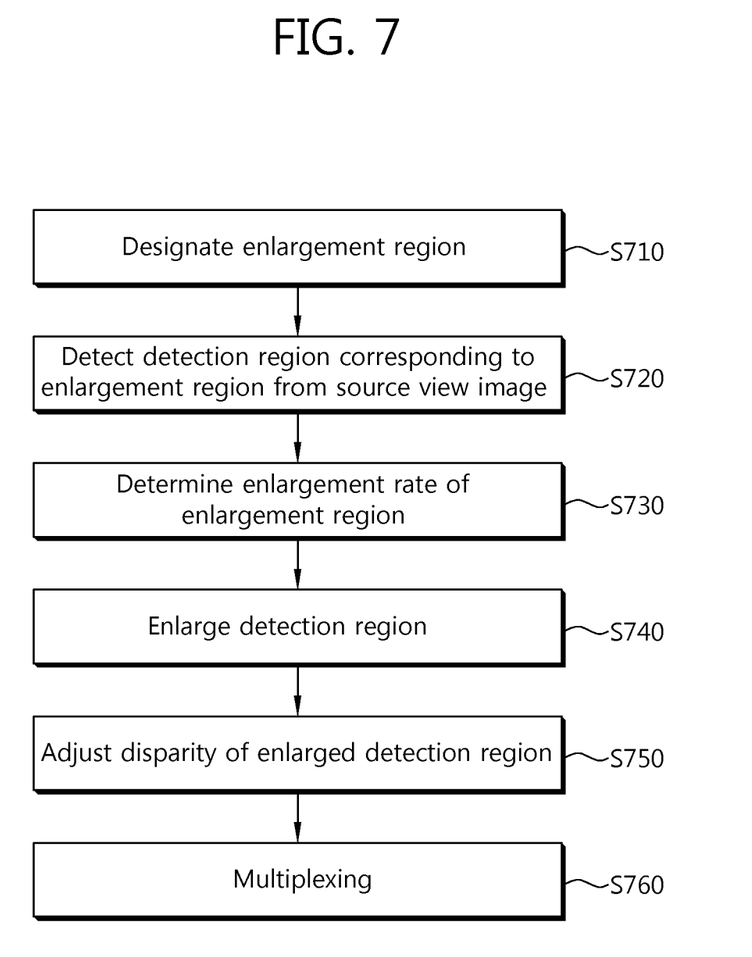
FIG. 7 is a flowchart illustrating a method of adjusting the depth of a 3D display image according to an embodiment of the present invention.

FIG. 7 is a flowchart illustrating a method of adjusting the depth of a 3D display image according to an embodiment of the present invention. The multiview video coding and/or decoding method according to the present invention can use the image depth adjustment method shown in FIG. 7. FIG. 7 shows the partial enlargement process shown in FIG. 5 in sequence. The depth adjustment method shown in FIG. 7 further includes a depth, that is, disparity adjustment method in addition to the image enlarging method of FIG. 3.

Referring to FIG. 7, an enlargement region is designated in a 3D display image (S710), which corresponds to enlargement region designation step S310 of FIG. 3. The enlargement region can be designated in a rectangular form or other forms. Only an object in the image can be designated as the enlargement region.

A detection region corresponding to the enlargement region is detected from a source view image (S720), which corresponds to detection region detection step S320 of FIG. 3.

An enlargement rate of the enlargement region is determined (S730), which corresponds to enlargement rate determination step S330 of FIG. 3. The enlargement rate may be determined according to user input. Otherwise, the enlargement rate may be gradually adjusted in the image enlarging apparatus. In this case, the image is enlarged according to the adjusted enlargement rate.

Upon determination of the enlargement rate, the detection region is enlarged (740), which corresponds to the detection region enlargement operation 501 of FIG. 5.

Then, disparity of the enlarged detection region is adjusted (750), which corresponds to the disparity adjustment operations 503 and 504 of FIGS. 5 and 6. The disparity adjustment method, the reason of disparity adjustment, and limitation in disparity adjustment has been described above with reference to FIGS. 5 and 6.

Finally processed multiview images are multiplexed (S760) to generate a partially enlarged 3D display image in an adjusted depth.

According to the aforementioned depth adjustment method, the depth of the 3D display image can be adjusted through image enlargement without deteriorating resolution.

Figure 8:
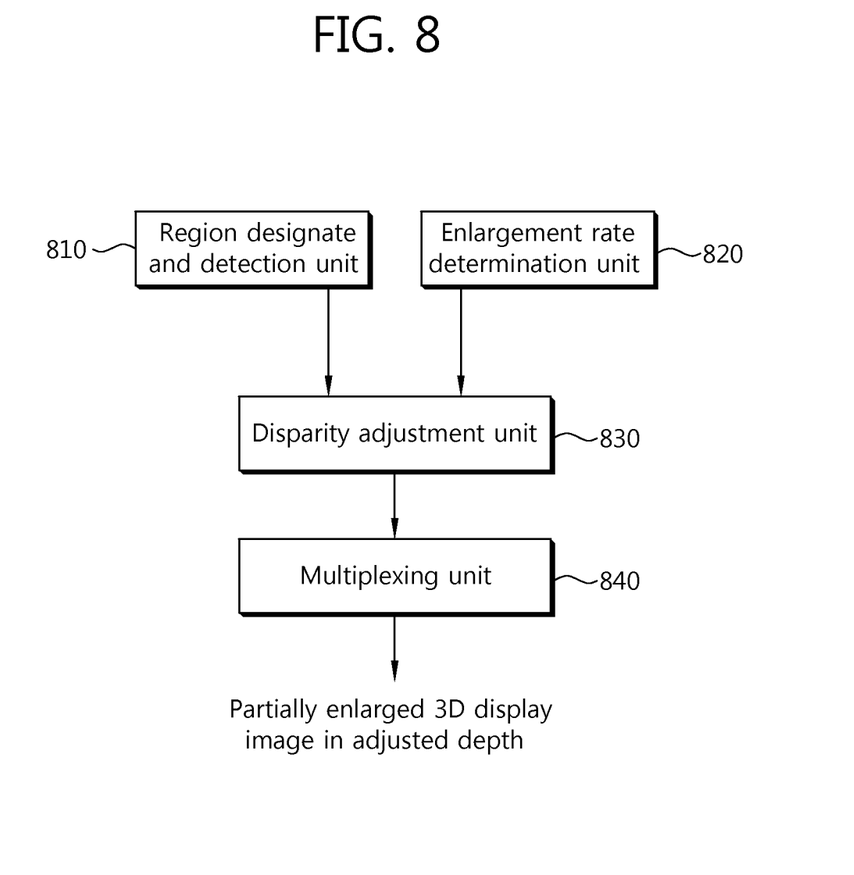
FIG. 8 is a block diagram of a depth adjustment apparatus in a 3D display according to an embodiment of the present invention.

FIG. 8 is a block diagram of a depth adjustment apparatus in a 3D display according to an embodiment of the present invention. The multiview video coding and/or decoding apparatus according to the present invention may include the depth adjustment apparatus shown in FIG. 8. Referring to FIG. 8, the depth adjustment apparatus includes a region designation and detection unit 810, an enlargement rate determining unit 820, a disparity adjustment unit 830, and a multiplexing unit 840.

The region designation and detection unit 810 may designate an enlargement region in a 3D display image by generating enlargement region information. In addition, the region designation and detection unit 810 may designate the enlargement region by receiving externally generated enlargement region information. The enlargement region may be designated in a rectangular form or other forms. Otherwise, only an object included in the image may be designated as the enlargement region. The region designation and detection unit 810 detects a detection region corresponding to the enlargement region from a source view image. The operation of the region designation and detection unit 810 corresponds to the operation of the region designation and detection unit 410 of FIG. 4.

The enlargement rate determination unit 820 may determine an enlargement rate by receiving enlargement rate information input by a user. Otherwise, the enlargement rate determination unit 820 may determine the enlargement rate such that the enlargement rate is gradually adjusted. In this case, the enlargement region is enlarged according to the adjusted enlargement rate. The operation of the enlargement rate determination unit 820 corresponds to the operation of the enlargement rate determination unit 420 of FIG. 4.

The disparity adjustment unit 830 enlarges the detection region on the basis of the enlargement region information and the enlargement rate information, which corresponds to the detection region enlargement operation 501 of FIG. 5 and detection region enlargement step S740 of FIG. 7. Then, disparity adjustment unit 830 adjusts disparity of the enlarged detection region, which corresponds to the disparity adjustment operations 503 and 504 of FIGS. 5 and 6 and disparity adjustment step S750 of FIG. 7. The disparity adjustment method, the reason of disparity adjustment, and limitation in disparity adjustment has been described above with reference to FIGS. 5 and 6.

Upon disparity change, the depth of a target object in the 3D display image is changed. The disparity adjustment unit 830 outputs finally processed multiview images including disparity-adjusted images. The disparity-adjusted images correspond to the disparity-adjusted images 550 and 560 shown in FIGS. 5 and 6.

The multiplexing unit 840 multiplexes the finally processed multiview images to generate a partially enlarged 3D display image in an adjusted depth.

The depth adjustment apparatus can adjust the depth of the 3D display image through image enlargement without deteriorating resolution.

In the present invention, multiview images are not limited to multiview images having two or more views. The present invention can be applied to a spatial division based multi-view display in which the size of an image when output becomes different from the size of the image when input. The present invention can also be applied to a stereoscopic display using two-view images only.

While the methods have been described as steps or blocks on the basis of flowcharts in the above embodiments, the present invention is not limited to the order of steps and some steps can be generated in a different sequence or simultaneously. It will be understood by those skilled in the art that steps of a flowchart are not exclusive and can include other steps, or one or more steps of the flowchart can be deleted without affecting the scope of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An image enlarging apparatus for a 3D display image, comprising:
    a region designation and detection unit configured to designate an enlargement region in the 3D display image based on enlargement region information, and to detect, from source view images, detection regions corresponding to the enlargement region of the 3D display image, wherein the 3D display image is formed based on the source view images, and the source view images comprise different views of a scene at a point in time;
    an enlargement rate determination unit configured to determine an enlargement rate of the enlargement region; and
    a scalable multiplexing unit configured to multiplex non-detection regions other than the detection regions in the source view images in a predetermined resolution, and to multiplex the detection regions in a resolution different from that of the non-detection regions, on the basis of the enlargement rate,
    wherein an enlargement rate for image enlargement without deteriorating resolution has a range represented by:

$1 \leq X\_Ratio \leq (Ix/Ox)$, and $1 \leq Y\_Ratio \leq (Iy/Oy)$, wherein (O≤I), wherein X_Ratio denotes an enlargement rate of X axis, wherein Y_Ratio denotes an enlargement rate of Y axis, Ix and Iy represent a resolution of a source view image, and wherein Ox and Oy represent a resolution of a source view image multiplexed and displayed in a multiview display.

2. The image enlarging apparatus of claim 1, wherein multiplexing comprises pixel-rearranging the source view images to generate the 3D display image, and wherein a larger quantity of source view images results in a lower resolution per source view image in the 3D display image.

3. The image enlarging apparatus of claim 1, wherein in response to scalable multiplexing being performed on the source view images, the detection regions are scalable-multiplexed in a resolution corresponding to (O/I)*Ratio of the resolution of the source view image, wherein I represents a resolution of a source view image, O represents a resolution of a source view image multiplexed and displayed in multiview display, and Ratio denotes the enlargement rate.

4. The image enlarging apparatus of claim 1, wherein as a scalable multiplexing result, the resolution of the source view regions is maintained as (O/I)*Ratio, compared to the resolution of the source view image, and wherein the resolution of the regions other than the detection regions in the source images is reduced to O/I.

5. The image enlarging apparatus of claim 1, wherein the enlargement rate determination unit is configured to receive enlargement rate information, and is configured to determine the enlargement rate on the basis of the received enlargement rate information.

6. The image enlarging apparatus of claim 1, wherein the scalable multiplexing unit is configured to multiplex the detection regions in a resolution equal to or higher than the resolution of the non-detection regions.

7. The image enlarging apparatus of claim 1, wherein the scalable multiplexing unit is configured to resize the non-detection regions and is configured to multiplex the detection regions in a resolution corresponding to a value obtained by multiplying the resolution of the resized non-detection regions by the enlargement rate.

8. The image enlarging apparatus of claim 1, wherein the scalable multiplexing unit comprises:
    a disparity adjustment unit configured to generate a partially enlarged image corresponding to the source view images by resizing the non-detection regions in the source view images, resizing the detection regions at a rate different from that of the non-detection regions, on the basis of the enlargement rate, and adjusting a disparity of the resized detection regions; and
    a multiplexing unit configured to perform multiplexing on the basis of the partially enlarged image.

9. An image enlarging method for a 3D display image, comprising the steps of:
    designating an enlargement region in the 3D display image based on enlargement region information;
    detecting, from source view images, detection regions corresponding to the enlargement region, wherein the 3D display image is formed based on the source view images, and the source view images comprise different views of a scene at a point in time;
    determining an enlargement rate of the enlargement region; and
    multiplexing non-detection regions other than the detection regions in the source view images in a predetermined resolution, and multiplexing the detection regions in a resolution different from that of the non-detection regions, on the basis of the enlargement rate,
    wherein an enlargement rate for image enlargement without deteriorating resolution has a range represented by:

$1 \leq X\_Ratio \leq (Ix/Ox)$, and $1 \leq Y\_Ratio \leq (Iy/Oy)$, wherein (O≤I), wherein X_Ratio denotes an enlargement rate of X axis, wherein Y_Ratio denotes an enlargement rate of Y axis, Ix and Iy represent resolution of a source view image, and wherein Ox and Oy represent a resolution of a source view image multiplexed and displayed in a multiview display.

10. A multiview video coding apparatus for a 3D display image, comprising:
a region designation and detection unit configured to designate an enlargement region in the 3D display image based on enlargement region information, and to detect, from source view images, detection regions corresponding to the enlargement region of the 3D display image, wherein the 3D display image is formed based on the source view images, and the source view images comprise different views of a scene at a point in time;
an enlargement rate determination unit configured to determine an enlargement rate of the enlargement region; and
a scalable multiplexing unit configured to multiplex non-detection regions other than the detection regions in the source view images in a predetermined resolution, and to multiplex the detection regions in a resolution different from that of the non-detection regions, on the basis of the enlargement rate,
wherein an enlargement rate for image enlargement without deteriorating resolution has a range represented by:

$$1 \leq X\_Ratio \leq (Ix/Ox), \text{ and}$$

$$1 \leq Y\_Ratio \leq (Iy/Oy),$$

wherein (O≤I), wherein X_Ratio denotes an enlargement rate of X axis, wherein Y_Ratio denotes an enlargement rate of Y axis, Ix and Iy represent resolution of a source view image, and wherein Ox and Oy represent a resolution of a source view image multiplexed and displayed in a multiview display.

11. The multiview video coding apparatus of claim 10, wherein the scalable multiplexing unit is configured to multiplex the detection regions in a resolution equal to or higher than the resolution of the non-detection regions.

12. The multiview video coding apparatus of claim 10, wherein the scalable multiplexing unit is configured to resize the non-detection regions and is configured to multiplex the detection regions in a resolution corresponding to a value obtained by multiplying the resolution of the resized non-detection regions by the enlargement rate.

13. The multiview video coding apparatus of claim 10, wherein the scalable multiplexing unit comprises:
a disparity adjustment unit configured to generate a partially enlarged image corresponding to the source view images by resizing the non-detection regions in the source view images, resizing the detection regions at a rate different from that of the non-detection regions, on the basis of the enlargement rate, and adjusting disparity of the resized detection regions; and
a multiplexing unit configured to perform multiplexing on the basis of the partially enlarged image.

14. A multiview video coding method for a 3D display image, comprising the steps of:
designating an enlargement region in the 3D display image based on enlargement region information;
detecting, from source view images, detection regions corresponding to the enlargement region, wherein the 3D display image is formed based on the source view images, and the source view images comprise different views of a scene at a point in time;
determining an enlargement rate of the enlargement region; and multiplexing non-detection regions other than the detection regions in the source view images in a predetermined resolution, and multiplexing the detection regions in a resolution different from that of the non-detection regions, on the basis of the enlargement rate,
wherein an enlargement rate for image enlargement without deteriorating resolution has a range represented by:

$$1 \leq X\_Ratio \leq (Ix/Ox), \text{ and}$$

$$1 \leq Y\_Ratio \leq (Iy/Oy),$$

wherein (O≤I), wherein X_Ratio denotes an enlargement rate of X axis, wherein Y_Ratio denotes an enlargement rate of Y axis, Ix and Iy represent resolution of a source view image, and wherein Ox and Oy represent a resolution of a source view image multiplexed and displayed in a multiview display.

15. A multiview video decoding apparatus for a 3D display image, comprising:
a region designation and detection unit configured to designate an enlargement region in the 3D display image based on enlargement region information, and to detect, from source view images, detection regions corresponding to the enlargement region of the 3D display image, wherein the 3D display image is formed based on the source view images, and the source view images comprise different views of a scene at a point in time;
an enlargement rate determination unit configured to determine an enlargement rate of the enlargement region; and
a scalable multiplexing unit configured to multiplex non-detection regions other than the detection regions in the source view images in a predetermined resolution, and to multiplex the detection regions in a resolution different from that of the non-detection regions, on the basis of the enlargement rate,
wherein an enlargement rate for image enlargement without deteriorating resolution has a range represented by:

$$1 \leq X\_Ratio \leq (Ix/Ox), \text{ and}$$

$$1 \leq Y\_Ratio \leq (Iy/Oy),$$

wherein (O≤I), wherein X_Ratio denotes an enlargement rate of X axis, wherein Y_Ratio denotes an enlargement rate of Y axis, Ix and Iy represent resolution of a source view image, and wherein Ox and Oy represent a resolution of a source view image multiplexed and displayed in a multiview display.

16. The multiview video decoding apparatus of claim 15, wherein the scalable multiplexing unit is configured to multiplex the detection regions in a resolution equal to or higher than the resolution of the non-detection regions.

17. The multiview video decoding apparatus of claim 15, wherein the scalable multiplexing unit is configured to resize the non-detection regions and is configured to multiplex the detection regions in a resolution corresponding to a value obtained by multiplying the resolution of the resized non-detection regions by the enlargement rate.

18. The multiview video decoding apparatus of claim 15, wherein the scalable multiplexing unit comprises:
a disparity adjustment unit configured to generate a partially enlarged image corresponding to the source view images by resizing the non-detection regions in the source view images, resizing the detection regions at a rate different from that of the non-detection regions, on the basis of the enlargement rate, and adjusting disparity of the resized detection regions; and a multiplexing unit configured to perform multiplexing on the basis of the partially enlarged image.

19. A multiview video decoding method for a 3D display image, comprising the steps of:

designating an enlargement region in the 3D display image based on enlargement region information;

detecting, from source view images, detection regions corresponding to the enlargement region, wherein the 3D display image is formed based on the source view images, and the source view images comprise different views of a scene at a point in time;

determining an enlargement rate of the enlargement region; and multiplexing non-detection regions other than the detection regions in the source view images in a predetermined resolution, and multiplexing the detection regions in a resolution different from that of the non-detection regions, on the basis of the enlargement rate, wherein an enlargement rate for image enlargement without deteriorating resolution has a range represented by:

$1 \leq X\_Ratio \leq (Ix/Ox)$, and $1 \leq Y\_Ratio \leq (Iy/Oy)$, wherein $(O \leq I)$, wherein X_Ratio denotes an enlargement rate of X axis, wherein Y_Ratio denotes an enlargement rate of Y axis, Ix and Iy represent resolution of a source view image, and wherein Ox and Oy represent a resolution of a source view image multiplexed and displayed in a multiview display.

* * * * *